United States Patent
Sugiyama et al.

(10) Patent No.: US 11,520,178 B2
(45) Date of Patent: Dec. 6, 2022

(54) LIQUID CRYSTAL DISPLAY DEVICE

(71) Applicant: Japan Display Inc., Tokyo (JP)

(72) Inventors: Ken Sugiyama, Tokyo (JP); Toshiyuki Tsubota, Tokyo (JP); Rina Yamamoto, Tokyo (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 17/382,021

(22) Filed: Jul. 21, 2021

(65) Prior Publication Data

US 2021/0349342 A1 Nov. 11, 2021

Related U.S. Application Data

(63) Continuation of application No. PCT/JP2019/050948, filed on Dec. 25, 2019.

(30) Foreign Application Priority Data

Jan. 25, 2019 (JP) .............................. JP2019-011450

(51) Int. Cl.
*G02F 1/1333* (2006.01)
*F21V 8/00* (2006.01)

(52) U.S. Cl.
CPC ..... *G02F 1/133314* (2021.01); *G02B 6/0068* (2013.01); *G02B 6/0088* (2013.01); *G02B 6/0091* (2013.01)

(58) Field of Classification Search
CPC ............ G02F 1/133314; G02B 6/0068; G02B 6/0088

See application file for complete search history.

(56) References Cited

U.S. PATENT DOCUMENTS

| | | |
|---|---|---|
| 2013/0308074 A1 | 11/2013 | Park et al. |
| 2015/0248035 A1 | 9/2015 | Kubo |
| 2017/0153488 A1 | 6/2017 | Shin |
| 2018/0180929 A1 | 6/2018 | Kim et al. |
| 2019/0212489 A1 | 7/2019 | Xu |

FOREIGN PATENT DOCUMENTS

| | | |
|---|---|---|
| JP | 2003295182 A | 10/2003 |
| JP | 2006010789 A | 1/2006 |
| JP | 2015176752 A | 10/2015 |
| JP | 2015211473 A | 11/2015 |

(Continued)

OTHER PUBLICATIONS

Google patent translation of KR20110067907A (Year: 2011).*

(Continued)

*Primary Examiner* — Lucy P Chien
(74) *Attorney, Agent, or Firm* — K&L Gates LLP (57) ABSTRACT

According to one embodiment, a display device includes a liquid crystal panel, a case covering a rear surface side of the liquid crystal panel, a backlight device disposed in the case and opposed to the liquid crystal panel with a gap, a first holding member provided on a side plate of the case, and a second holding member including a fixation part attached to the side plate of the case, and a second holding part interposed between an optical sheet and a rear surface of the liquid crystal panel to cover a light source device and an end part of the optical sheet on the light source device side.

17 Claims, 10 Drawing Sheets

(56) References Cited

FOREIGN PATENT DOCUMENTS

WO      2014046026 A1    3/2014
WO      2018051855 A1    3/2018

OTHER PUBLICATIONS

International Search Report dated Mar. 10, 2020 in Application No. PCT/JP2019/050948.
Indian Office Action dated Mar. 21, 2022 in corresponding Indian Application No. 202117033235.
Japanese Office Action dated Aug. 2, 2022 in corresponding Japanese Application No. 2019-011450.

* cited by examiner

LIQUID CRYSTAL DISPLAY DEVICE

CROSS-REFERENCE TO RELATED APPLICATIONS

This application is a Continuation Application of PCT Application No. PCT/JP2019/050948, filed Dec. 25, 2019 and based upon and claiming the benefit of priority from Japanese Patent Application No. 2019-011450, filed Jan. 25, 2019, the entire contents of all of which are incorporated herein by reference.

FIELD

Embodiments described herein relate generally to a liquid crystal display device.

BACKGROUND

In recent years, liquid crystal display devices are widely used as in-car display devices such as car navigation system and operation panel.

In general, in-car liquid crystal display devices are supposed to be arranged in a relatively wide mount space, and thus, it is important to have both rigidity and reliability. For example, the liquid crystal display device may be made relatively thicker while the frame area thereof is secured to be wide. However, because of increasing varieties of car interior space in recent years, thinner liquid crystal display devices with a narrow frame are required more and more. At the same time, in-car display devices are required to have sufficient rigidity and strength against impacts and oscillation in a long run within a wide temperature compensation range.

SUMMARY

The present application relates generally to a liquid crystal display device.

According to one embodiment, a display device includes a liquid crystal panel, a case covering a rear surface side of the liquid crystal panel, a backlight device disposed in the case and opposed to the liquid crystal panel with a gap, a first holding member provided on a side plate of the case, and a second holding member including a fixation part attached to the side plate of the case, and a second holding part interposed between an optical sheet and a rear surface of the liquid crystal panel to cover a light source device and an end part of the optical sheet on the light source device side.

DETAILED DESCRIPTION

Various embodiments will be described hereinafter with reference to the accompanying drawings. In general, according to one embodiment, a display device comprises a case comprising a bottom plate and a plurality of side plates standing along side edges of the bottom plate; a liquid crystal panel in the case, the liquid crystal panel having a rear surface opposed to the bottom plate with a gap therebetween; a backlight device between the liquid crystal panel and the bottom plate in the case, the backlight device comprising a light guide plate on the bottom plate, an optical sheet on the light guide plate and opposed to the rear surface of the liquid crystal panel with a gap therebetween, and a light source device between an incident surface of the light guide plate and one of the side plates, the light source device configured to supply light onto the incident surface; a first holding member provided on one of the side plates in the case to be interposed between a peripheral edge part of the optical sheet and the rear surface of the liquid crystal panel, the first holding member facing the peripheral edge part of the optical sheet; and a second holding member including a fixation part attached to the side plate which is opposed to the incident surface, and a second holding part interposed between the optical sheet and the rear surface of the liquid crystal panel to cover the light source device and an end part of the optical sheet on the light source device side.

The disclosure is merely an example, and proper changes within the spirit of the invention, which are easily conceivable by a skilled person, are included in the scope of the invention as a matter of course. In order to make the description clearer, the widths, thicknesses, shapes, etc., of the respective parts are schematically illustrated in the drawings, compared to the actual modes. However, the schematic illustration is merely an example, and adds no restrictions to the interpretation of the invention. In the specification and drawings, the same elements as those described in connection with preceding drawings are denoted by like reference numerals, and a detailed description thereof is omitted unless otherwise necessary.

EMBODIMENT

Figure 1:
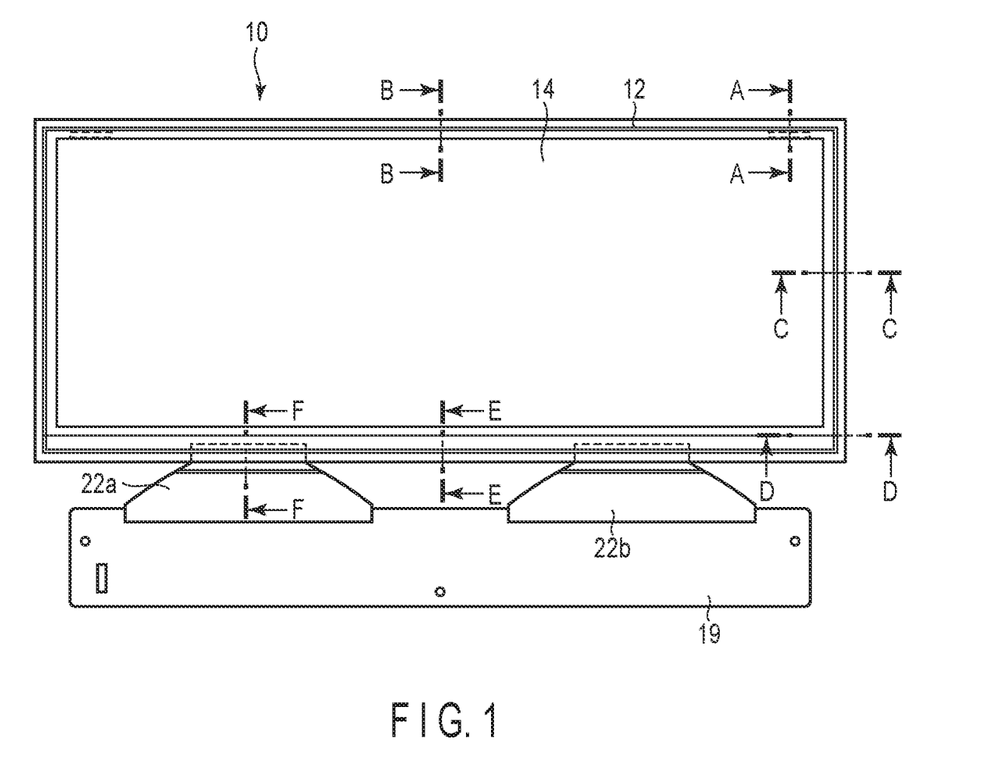
FIG. 1 is a plan view of a display surface side of a liquid crystal display device of an embodiment.
Figure 2:
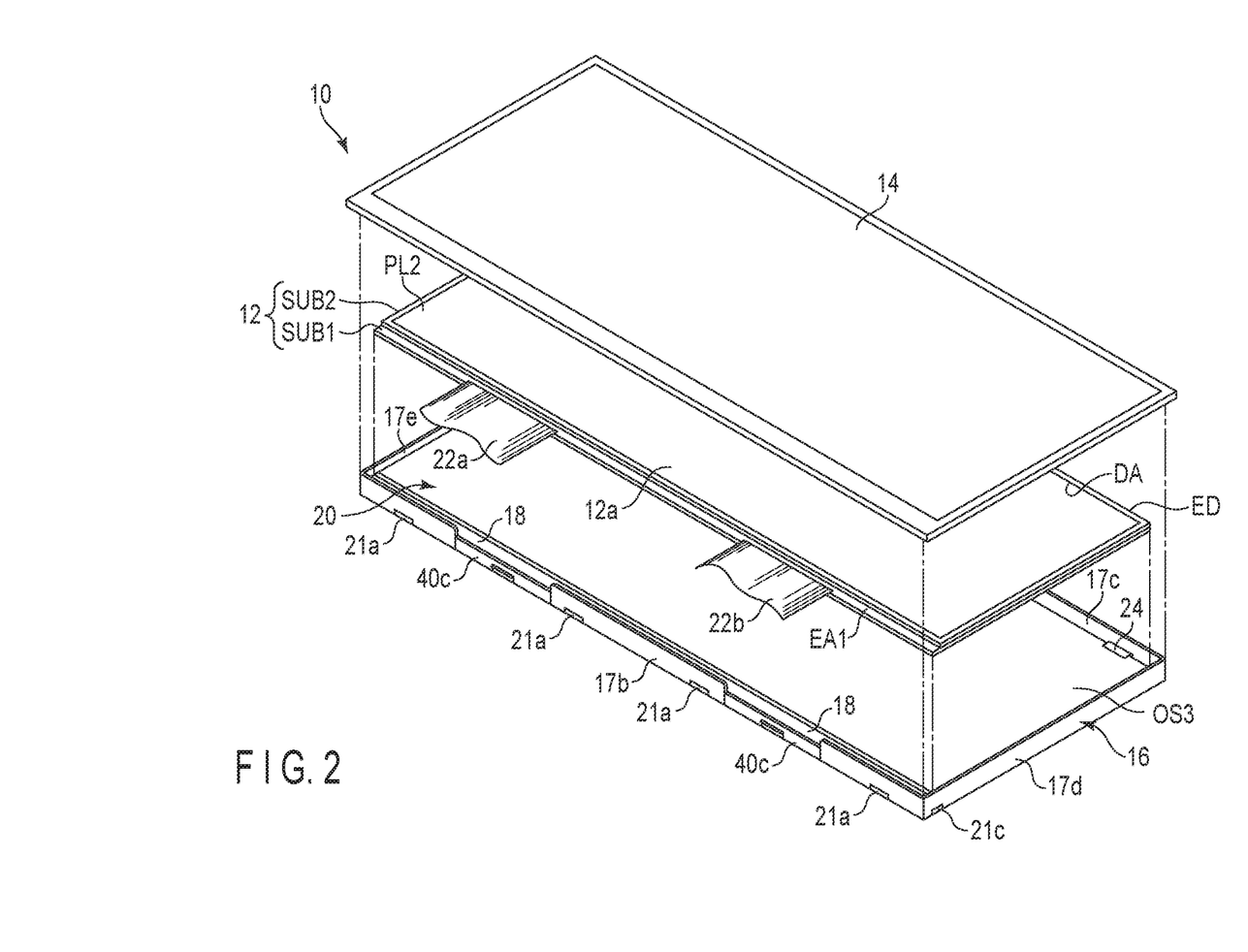
FIG. 2 is an exploded perspective view of the liquid crystal display device in a disassembled manner.

FIG. 1 is a plan view of a display surface side of a liquid crystal display device according to an embodiment, and FIG. 2 is an exploded perspective view of the liquid crystal display device.

A liquid crystal display device 10 is incorporated in various in-car devices such as car navigation system, operation panel, gauge panel, and the like.

As in FIGS. 1 and 2, the liquid crystal display device 10 comprises an active matrix liquid crystal display panel (liquid crystal panel) 12, a cover panel 14 overlaid on a display surface 12a which is one surface of the liquid crystal panel 12 while covering the entirety of the display surface 12a, and a backlight device (backlight unit) 20 disposed to be opposed to the rear surface which is the other surface of the liquid crystal panel 12. The liquid crystal panel 12 and the backlight device 20 are accommodated in an accommodation case (backlight cover) 16 (hereinafter referred to as case), upper part of which is opened. The accommodation case 16 is covered with a cover panel 14, and the cover panel 14 is fixed to the accommodation case 16. The liquid crystal display device 10 includes a control circuit board 19. The control circuit board 19 is arranged outside the case 16, and is electrically connected to the liquid crystal panel 12 through flexible printed circuit boards (FPCs) 22a and 22b.

Figure 9:
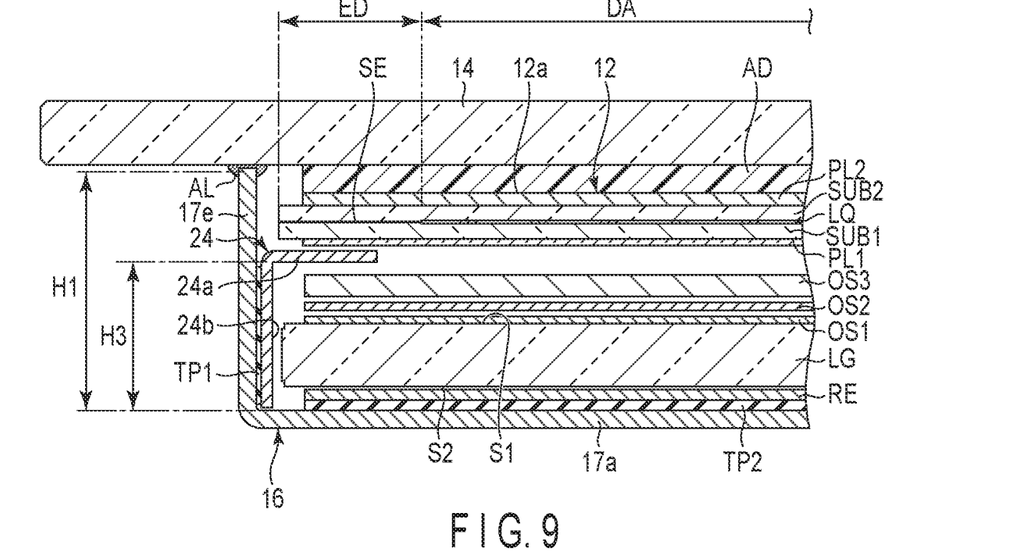
FIG. 9 is a cross-sectional view of the liquid crystal display device in a first holding part, taken along line A-A of FIG. 1.

FIG. 9 is a cross-sectional view of an opposite light source side of the liquid crystal display device, taken along line A-A of FIG. 1. As in FIGS. 2 and 9, the liquid crystal panel 12 includes a rectangular first substrate SUB1, rectangular second substrate SUB2 disposed to be opposed to the first substrate SUB1, and liquid crystal layer LQ disposed between the first substrate SUB1 and the second substrate SUB2. The first substrate SUB1 and the second substrate SUB2 are formed as a transparent insulating substrate such as glass substrate or resin substrate. The peripheral part of the second substrate SUB2 is adhered to the first substrate SUB1 with a sealant SE. For example, the second substrate SUB2 includes a pair of long sides and a pair of short sides, wherein the long sides are formed to have a substantially same length as a pair of long sides of the first substrate SUB1. The pair of short sides of the second substrate SUB2 are formed to be slightly shorter than a pair of short sides of the first substrate SUB1. While the second substrate SUB2 and the first substrate SUB1 are adhered together, one long side end EA1 of the first substrate SUB1 does not overlap the second substrate SUB2. A polarizer PL2 is adhered to the surface of the second substrate SUB2 to form the display surface 12a of the liquid crystal panel 12. A polarizer PL1 is adhered to the surface of the first substrate SUB1 (rear surface of liquid crystal panel 12).

The liquid crystal panel 12 includes, as in a plan view of the display surface 12a (plan view means viewing the liquid crystal panel from the normal direction thereof), a rectangular display area (active area) DA in an area inside the sealant SE. Around the display area DA, a rectangular frame-shaped frame area (non-display area) ED is disposed. Light from the backlight unit 20 is selectively passed per pixel by the display area DA, and an image is thus displayed on the display area DA.

One end of each of two FPCs 22a and 22b is attached to the long side end EA1 of the first substrate SUB1, and is electrically connected to the liquid crystal panel 12. The FPCs 22a and 22b extend outward from the liquid crystal panel 12, and are connected to the control circuit board 19. On the control circuit board 19, as a signal supplier configured to supply signals necessary for the drive of the liquid crystal panel 12, a plurality of semiconductor elements such as driver IC chips and the like which are not shown are mounted.

As shown in FIGS. 1, 2, and 9, the cover panel 14 is formed of, for example, a glass plate, an acrylic transparent resin, or the like, to be a rectangular plate. The cover panel 14 is formed to have greater width and length than the dimensions of the liquid crystal panel 12 (width and length), and in a plan view, has a greater area than the liquid crystal panel 12. The rear surface of the cover panel 14 (rear surface, surface in the liquid crystal display panel side) is adhered to the display surface 12a of the liquid crystal panel 12 with an adhesive layer AD formed of, for example, a transparent adhesive agent, and the rear surface of the cover panel 14 covers the entire surface of the display surface 12a. The adhesive layer AD is formed to have substantially same dimensions (width and length) as the polarizer PL2, and is adhered to the entire surface of the polarizer PL2. If a state where the cover panel 14 is adhered to the liquid crystal panel 12 is viewed in a plan view, the peripheral part of the cover panel 14 protrudes outside than the outer periphery of the liquid crystal panel 12.

Now, the case 16 and the backlight unit 20 will be explained.

Figure 3:
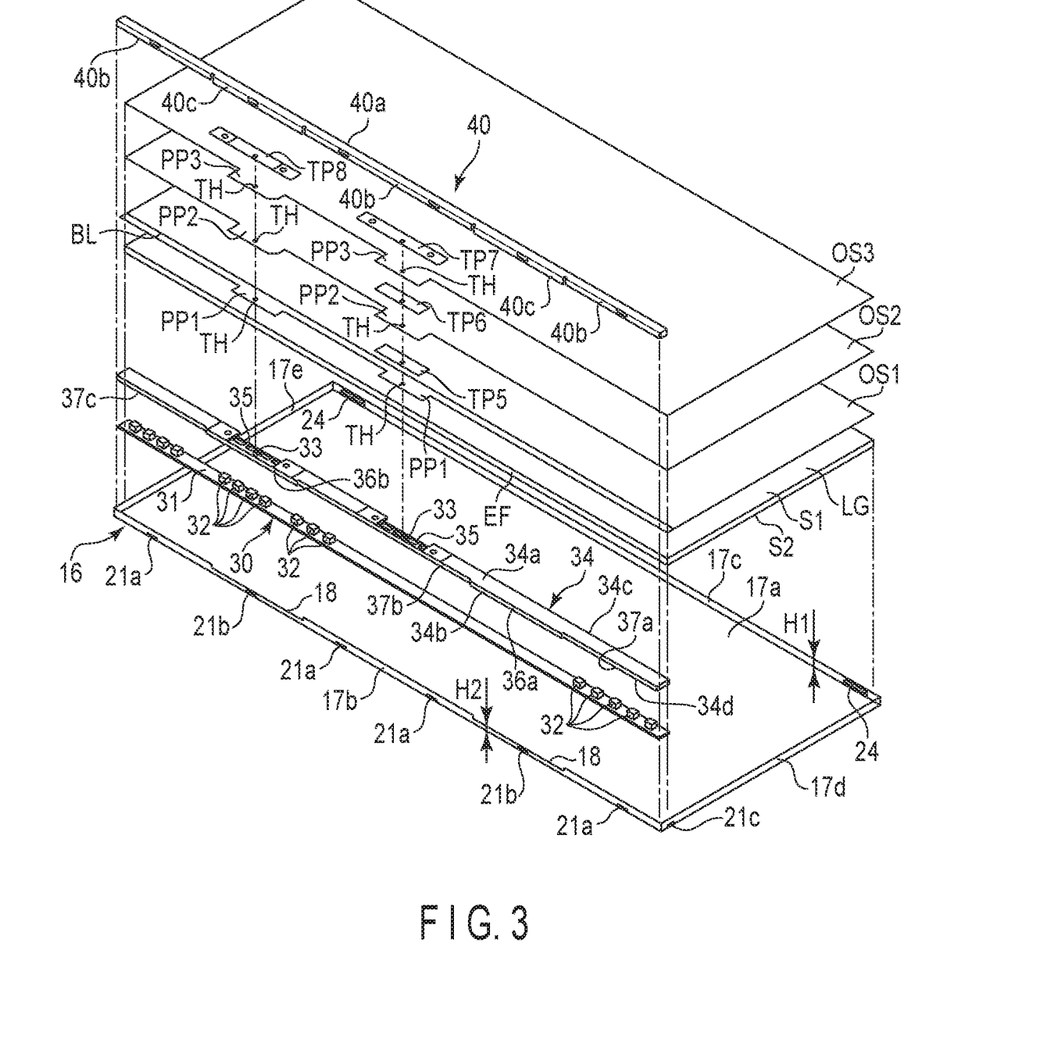
FIG. 3 is a perspective view of a backlight device of the liquid crystal display device in a disassembled manner.

FIG. 3 is an exploded perspective view of the case and the backlight unit. As in FIGS. 2 and 3, the case 16 covering the backlight unit 20 is formed of a thin plate material. The case 16 is formed as a flat rectangular box shape with the upper part thereof is opened through, for example, bending or pressing of a stainless plate material of 0.2 mm thickness. When the plate thickness of the case 16 becomes thinner, the frame becomes narrower, and the thickness of the entirety of the display device can be thinner.

The case 16 comprises a rectangular bottom plate 17a, a pair of long-side side plates 17b and 17c and a pair of short-side side plates 17d and 17e standing on side edges of the bottom plate 17a. In a plan view, dimensions of the bottom plate 17a are greater than the dimensions of the liquid crystal panel 12, and are smaller than the dimensions of the cover panel 14. In the present embodiment, the side plates (first side plate, second side plate) 17b and 17c are standing approximately perpendicular to the bottom plate 17a, and extends over the entire length of each long side of the bottom plate 17a. The side plates 17d and 17e are standing approximately perpendicular to the bottom plate 17a, and extend over the entire length of each short side of the bottom plate 17a. A height H1 of the side plates 17b to 17e measured from the bottom plate 17a is set equal to or greater than a sum of the thickness of the liquid crystal panel 12 and the thickness of the backlight unit 20.

The side plate (first side plate) 17b positioned in the light source side includes two concaves 18 formed on the upper edge thereof. The concaves 18 are each formed in a rectangular shape extending in the longitudinal direction of the side plate 17b. Two concaves 18 are arranged in the longitudinal direction of the side plate 17b at an interval. A height H2 of the side plate 17b in the part where the concaves 18 are formed is approximately 60% of the height H1 of the other part, and that is substantially the same as the thickness of the backlight unit 20. As will be described later, two FPCs 22a and 22b extending from the liquid crystal panel 12 are drawn to the outside of the case 16 through the concaves 18.

The wall part of the side plate 17b where the concaves 18 are formed includes a second stopper claw 21b slightly protruding outward the case 16. The other wall part of the side plate 17b includes a plurality of first stopper claws 21a slightly protruding inward the case 16. The end of each of the side plates 17d and 17e in the side plate 17b side includes a third stopper claw 21c slightly protruding inward the case 16. The first to third stopper claws 21a, 21b, and 21c are formed as cut tips through cutting a part of the side plates.

Figure 4:
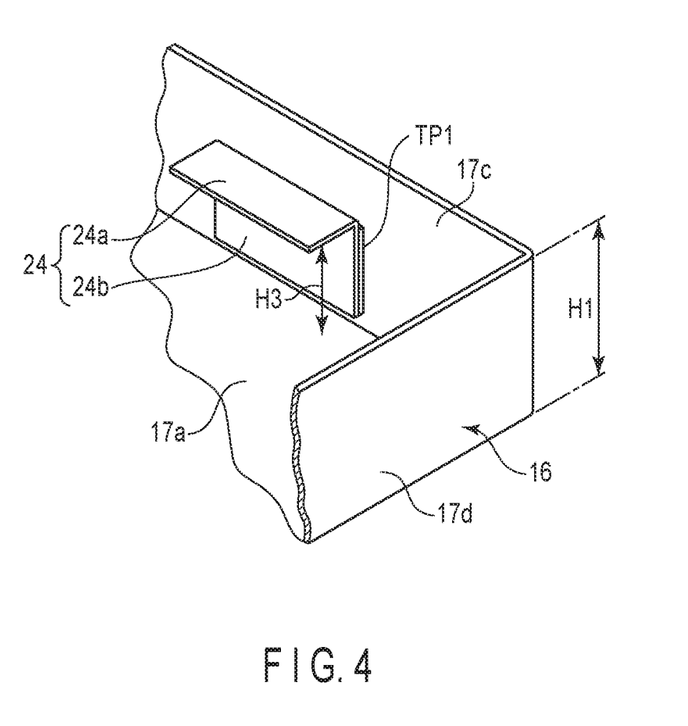
FIG. 4 is a perspective view of a case and a first holding member of the backlight device.

FIG. 4 is a perspective view of an end of the case on a side opposite to the light source. As in FIGS. 3 and 4, first holding members 24 are provided with both ends of the side plate (second side plate) 17c in the longitudinal direction, respectively. The first holding member 24 is, for example, a metal plate material bent in an L-letter shape, and integrally includes a flat rectangular first holding part 24a and a flat rectangular fixation part 24b orthogonal to the first holding part 24a.

As in FIGS. 4 and 9, the fixation part 24b is adhered and fixed to the inner surface of the side plate 17c with, for example, a double sided tape TP1. The first holding part 24a protrudes from the side plate 17c inward the case 16 to be opposed to the bottom plate 17a in an approximately parallel fashion. A height H3 measured from the bottom plate 17a to the first holding part 24a is set slightly greater than the thickness of the backlight unit 20.

Note that there may be three or more first holding members 24 provided, instead of two. Furthermore, the position thereof may not be both ends of the side plate 17c in the longitudinal direction but may be ends of the side plates 17d and 17e in the side plate 17c side. Furthermore, the first holding member 24 may not be an independent plate but may be a cut tips formed by cutting a part of the side plate 17c or side plates 17d and 17e inward the case 16.

Figure 10:
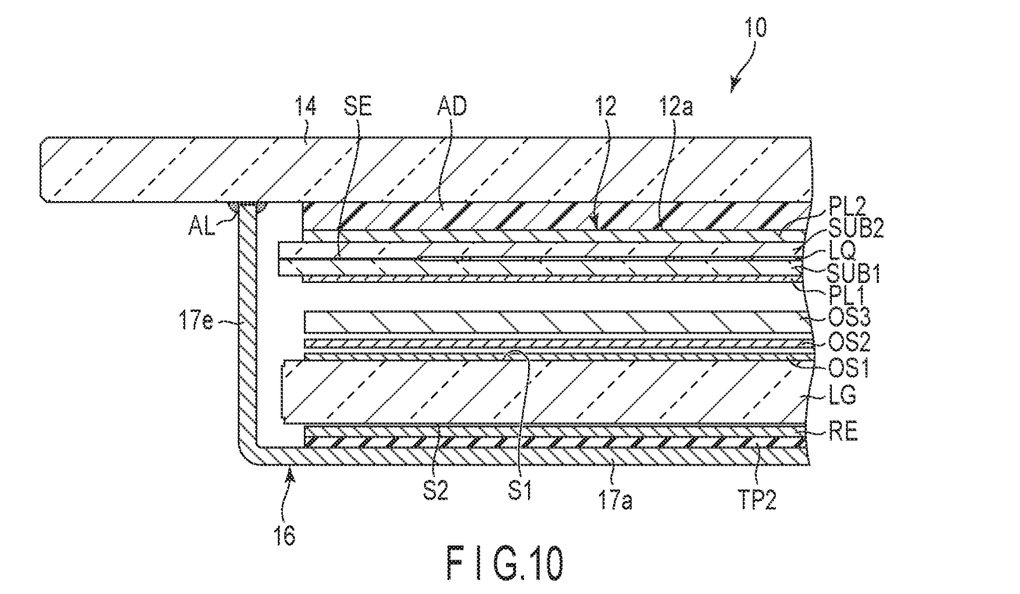
FIG. 10 is a cross-sectional view of the long side end of the liquid crystal display device, taken along line B-B of FIG. 1.
Figure 11:
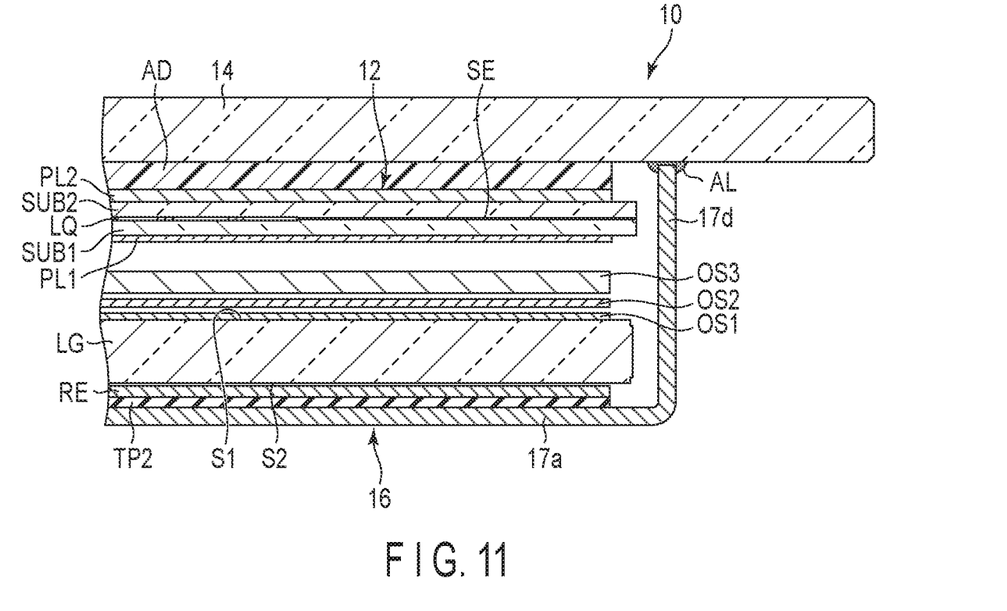
FIG. 11 is a cross-sectional view of the short side end of the liquid crystal display device, taken along line C-C of FIG. 1.
Figure 12:
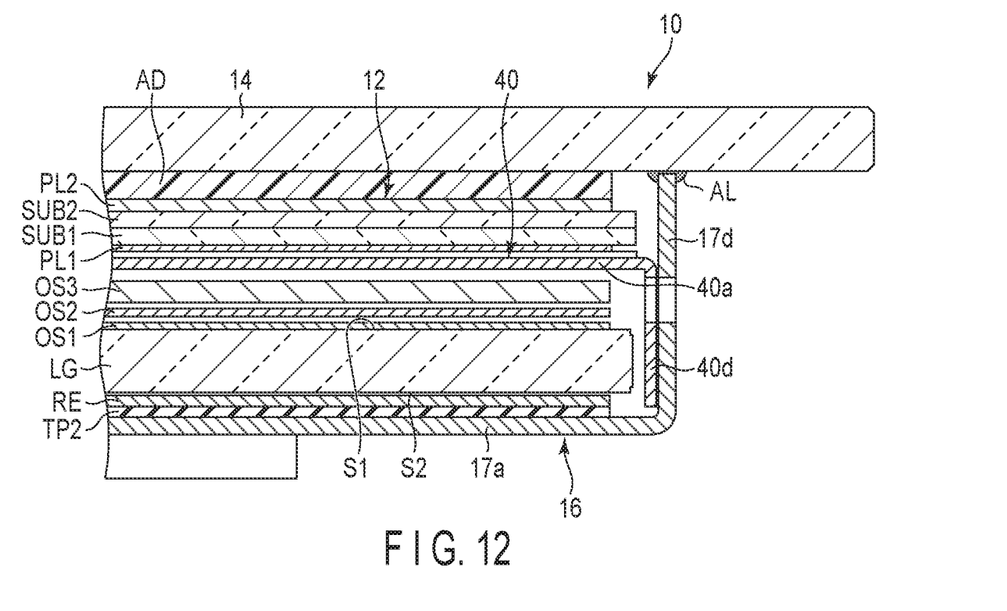
FIG. 12 is a cross-sectional view of the short side end of the liquid crystal display device, taken along line D-D of FIG. 1.
Figure 13:
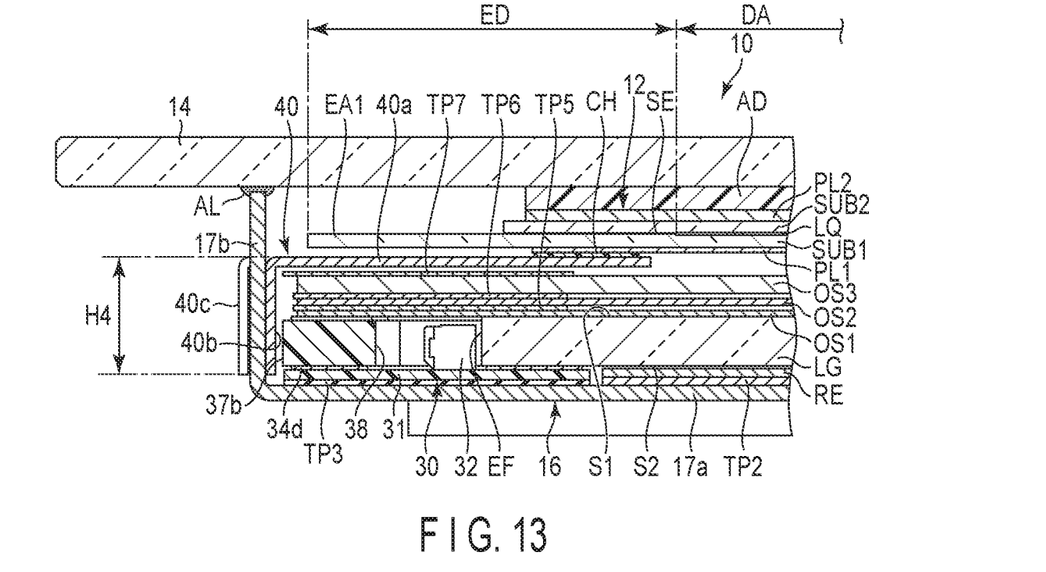
FIG. 13 is a cross-sectional view of the light source side long side of the liquid crystal display device, taken along line E-E of FIG. 1.
Figure 14:
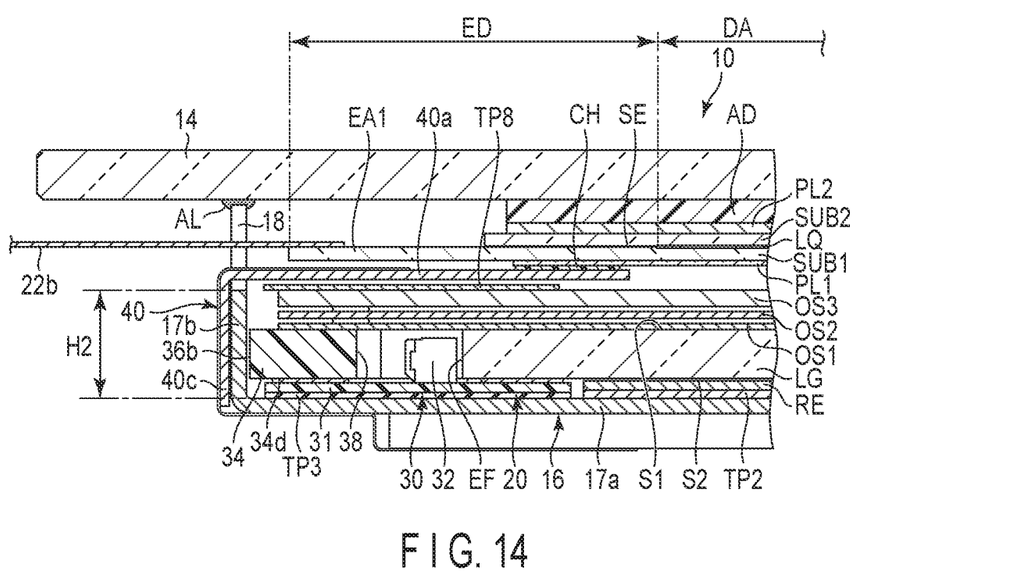
FIG. 14 is a cross-sectional view of the light source side long side of the liquid crystal display device, taken along line F-F of FIG. 1.

FIG. 10 is a cross-sectional view of the liquid crystal display device in the opposite light source side, taken along line B-B in FIG. 1. FIGS. 11 and 12 are cross-sectional views of short side ends of the liquid crystal display device, taken along line C-C and line D-D in FIG. 1, respectively. FIGS. 13 and 14 are cross-sectional views of the liquid crystal display device in the light source side, taken along line E-E and line F-F in FIG. 1, respectively.

As in FIGS. 2 and 9 to 14, the case 16 structured as above is arranged over the backlight unit 20 and the liquid crystal panel 12. Furthermore, the edges of the side plates 17b and 17c, and the upper edges of the side plates 17d and 17e of the case 16 are adhered to the lower surface of the cover panel 14 with an adhesive agent AL to be fixed to the cover panel 14. For example, a thermal cured adhesive agent is used as the adhesive agent AL. The bottom plate 17a of the case 16 is opposed to the rear surface of the liquid crystal panel 12 in an approximately parallel fashion with a gap therebetween. The side plates 17b and 17c and the side plates 17d and 17e are opposed to their corresponding side edges of the liquid crystal panel 12 with a slight gap (for example, 0.1 to 0.5 mm) therebetween. The upper edges of the side plates 17b, 17c, 17d, and 17e are inserted to the adhesive agent AL to be adhered and fixed to the cover panel 14 with the adhesive agent AL in a manner where the adhesive agent AL is interposed between the upper edges and the inner surface of the cover panel 14. With the adhesive agent AL is interposed, the upper edges of the side plates are prevented from damaging the inner surface of the cover panel 14 by directly contacting thereto. Furthermore, with the elasticity of the adhesive agent AL, deformation of the case 16 does not easily transfer to the cover panel 14 and the liquid crystal panel 12, and thus, unevenness of the gaps in the liquid crystal panel 12 or the like can be avoided.

Note that a flange extending outward the case may be provided with the upper edge of each side plate in order to adhere and fix the flange to the cover panel 14 with a double sided tape or an adhesive agent. With such a flange, an area for adhesion is widened, and thus, the case 16 can be firmly fixed to the cover panel 14.

As shown in FIG. 14, while the case 16 is attached to the cover panel 14, the FPCs 22a and 22b extending from the liquid crystal panel 12 extend outward the case 16 through the concaves 18 of the side plate 17b.

The backlight unit 20 will be explained. As in FIGS. 2 and 3, the backlight unit 20 comprises a plurality of optical members disposed in the case 16 and a light source device (light source unit) 30 configured to supply light to the optical members. The optical members include a reflective sheet RE disposed on the bottom plate 17a, which will be described later, a rectangular light guide plate LG disposed on the reflective sheet RE, and a plurality of approximately rectangular optical sheets arranged on the light guide plate LG which are, for example, optical sheets OS1, OS2, and OS3.

The light source unit 30 includes a slender stripe-shaped printed circuit board (FPC, hereinafter referred to as wiring board) 31 having a substantially same length as the long side of the case 16, and a plurality of light sources mounted on the wiring board 31, which are, for example, light emitting diodes (LEDs) 32. The light source unit 30 is, on the bottom plate 17a, disposed in the proximity of the side plate 17b extending along the entire length of the side plate 17b. The LEDs 32 are arranged in the longitudinal direction of the wiring board 31 (direction parallel to the side plate 17b) at certain intervals. Note that, the wiring board 31 includes a connection end extending from one side edge, which is not shown, and through connection of the connection end to the FPC 22a or 22b, or the control circuit board 19, the wiring board 31 is connectable to the power source.

The backlight unit 20 or the case 16 further comprises a slender prism-shaped spacer plate 34 arranged over the light source unit 30, and a second holding member 40 attached to the side plate 17b to hold the optical sheets OS1 to OS3.

The spacer plate 34 is formed of, for example, a synthetic resin. The spacer plate 34 includes an upper surface 34a having a substantially same length as with the side plate 17b, side surface 34b opposed to the side plate 17b, bottom surface 34d opposed to the light source unit 30, and side surface 34c opposed to the light guide plate LG. Positioning concaves 35 are provided with two points of the upper surface 34a, and furthermore, a positioning pin 33 is disposed on the bottom surface of the concave 35. Furthermore, the side surface 34b of the spacer plate 34 includes two convex 36a and 36b which can contact the side plate 17b and three concaves 37a, 37b, and 37c opposed to the side plate 17b with a gap therebetween. Two convex 36a and 36b are each positioned to contact the part with which the concave 18 of the side plate 17b is provided, and the concaves 37a, 37b, and 37c are provided with both sides of each of the convex 36a and 36b in the longitudinal direction. Furthermore, many concaves 38 are formed on the bottom surface 34d and the side surface 34c of the spacer plate 34 to accommodate the LEDs 32.

Figure 5:
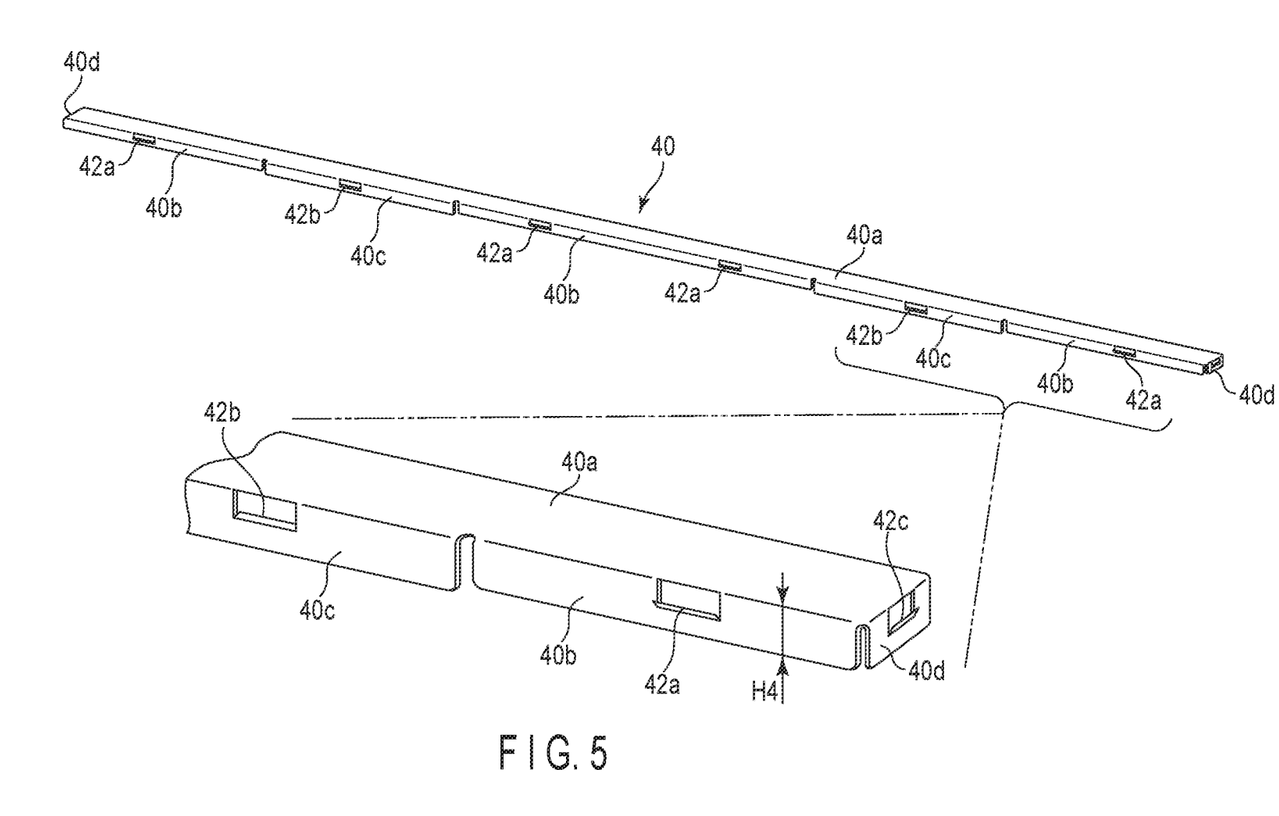
FIG. 5 is a perspective view of a second holding member of the backlight device.

FIG. 5 is a perspective view of the second holding member shown in a partly enlarged manner.

As in the figure, the second holding member 40 is formed of, for example, a metal plate material bent in an L-letter shape, and integrally includes a slender rectangular second holding part 40a, a plurality of first fixation parts each orthogonal to one side edge of the second holding part 40a, that is, three first fixation parts 40b in this example, two second fixation parts 40c each orthogonal to the one side edge of the second holding part 40a, and two rectangular third fixation parts 40d orthogonal to both end edges of the first holding part 40a in the longitudinal direction.

The second holding part 40a has a predetermined width which is substantially equal to the side plate 17b and is greater than the upper surface 34a of the spacer plate 34. The first fixation part 40b and the second fixation part 40c are arranged alternately in the second holding part 40a in the longitudinal direction. In the present embodiment, the first fixation parts 40b are disposed in both ends and center part of the second holding member 40 in the longitudinal direction, and the second fixation parts 40c are each disposed between two first fixation parts 40b. Three first fixation parts 40b are arranged on the first plan orthogonal to the second holding part 40a, and two second fixation parts 40c are arranged on the second plan orthogonal to the second holding part 40a. The first plan and the second plan are opposed to each other with a predetermined gap therebetween, which is substantially equal to the thickness of the side plate 17b. That is, each second fixation part 40c is disposed, with respect to the first fixation part 40b, in a positioned shifted in the direction to be apart from the second holding part 40a by the thickness of the side plate 17b, and to be substantially parallel to the first fixation part 40b.

A height (width) H4 of the first fixation part 40b, second fixation part 40c, and third fixation part 40d (cf. FIG. 13) is formed to be greater than the thickness of the backlight unit 20.

To each first fixation part 40b, one or more first stopper claws 42a slightly protruding outward the case 16. To each second fixation part 40c, a second stopper claw 42b slightly protruding inward the case 16. To each third fixation part 40d, one or more third stopper claws 42c slightly protruding outward the case 16. The first to third stopper claws 42a, 42b, and 42c are formed as cut tips by cutting a part of the plate member of each fixation part, for example.

As in FIGS. 2, 3, and 9 to 14, the reflective sheet RE of the backlight unit 20 is disposed on the bottom plate 17a of the case 16, and is opposed to substantially the entire surface of the bottom plate 17a except for the end in the light source side. In the present embodiment, the reflective sheet RE is adhered to the bottom plate 17a through the double-side tape TP2.

The light guide plate LG is formed of a transmissive resin, for example, acrylic or silicon resin, in a rectangular parallelepiped shape. The light guide plate LG includes a first main surface 51 as an exit surface, second main surface S2 opposite to the first main surface 51, and incident surface EF disposed between the end of the first main surface 51 and the end of the second main surface S2. In the present embodiment, one side surface of the light guide plate LG in the long-side side is the incident surface EF. The light guide plate LG is formed to have a dimension (length and width) which is slightly smaller than the inside measure dimension of the case 16 in a plan view, and a dimension which is slightly greater than the display area DA of the liquid crystal panel 12. The light guide plate LG is disposed over the reflective sheet RE while the second main surface S2 is opposed to the reflective sheet RE. The incident surface EF of the light guide plate LG is opposed to the side plate 17b of the case 16 with a gap therebetween. The other side surface of the light guide plate LG is opposed to the side plates 17c and the side plates 17d and 17e of the case 16 with a slight gap (for example, 0.1 to 0.5 mm) therebetween.

As in FIGS. 3, 13, and 14, the light source unit 30 is disposed in the proximity of the side plate 17b on the bottom plate 17a and is disposed along the entire length of the side plate 17b. The wiring board 31 is adhered to the bottom plate 17a with a double sided tape TP3. The wiring board 31 is disposed between the reflective sheet RE and the side plate 17b. The end of the light guide plate LG in the light source side is positioned on the side edge of the wiring board 31, and is adhered to the wiring board 31 with a double sided tape. LEDs 32 mounted on the wiring board 31 are arranged such that each exit surface thereof is adjacent to the incident surface EF of the light guide plate LG, or contacts the incident surface EF.

The spacer plate 34 is disposed between the incident surface EF of the light guide plate LG and the side plate 17b, and is mounted over the wiring board 31. At least a part of the bottom surface 34d of the spacer plate 34 is adhered to the wiring board 31 with a double sided tape or an adhesive agent. One side surface of the spacer plate 34 contacts the incident surface EF, convex 36a and 36b of the other side surface contact the side plate 17b or are opposed to the side plate 17b with a gap therebetween. With the spacer plate 34, a gap between the light guide plate LG and the side plate 17b is maintained to a certain degree.

Figure 7:
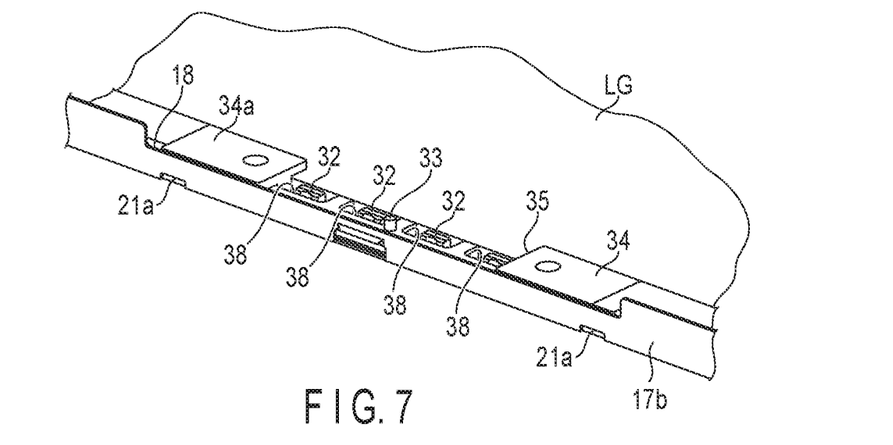
FIG. 7 is a perspective view of the light source side end of the case.

FIG. 7 is a perspective view of a part of the spacer plate 34 attached to the case 16. As in FIGS. 7, 13, and 14, while the spacer plate 34 is attached, each LED 32 is accommodated in the corresponding concave 38 of the spacer plate 34 at intervals. Furthermore, the first main surface 51 of the light guide plate LG is substantially flashed with the bottom surface of the concave 35 of the spacer plate 34.

As in FIG. 3, each of the optical sheets OS1 to OS3 is formed in a rectangular shape having a substantially same length as the light guide plate LG, and a slightly greater width than the light guide plate LG. The optical sheet OS1 includes two convex PP1 for positioning which protrude from one long side in the light source side. A hole TH through which the positioning pin is inserted is formed in the center of each convex PP1. Similarly, the optical sheets OS2 and OS3 include two convex PP2 and PP3 for positioning protruding from the long side, respectively, and a hole TH is formed in each convex. Furthermore, on at least one optical sheet, that is, on the light source side end of the lowermost optical sheet OS1 and the convex PP1 in this example, a light shielding layer BL including a black printed layer and the like is disposed.

In the present embodiment, as the optical sheets OS1, OS2, and OS3, diffusion sheets OS1 and OS2 formed of a synthetic resin such as polyethylene terephthalate, and a prism sheet OS3 are used.

Figure 8:
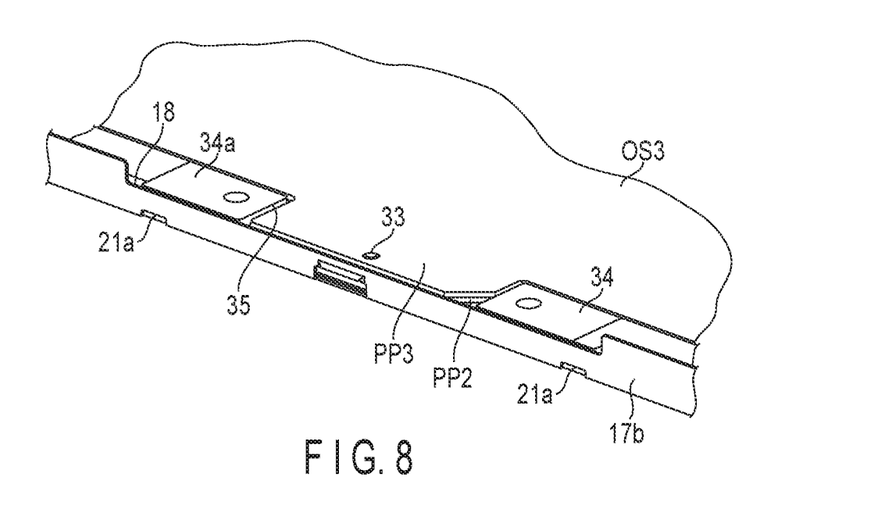
FIG. 8 is a perspective view of the case in the light source side, illustrating a state where an optical sheet is disposed.

As in FIGS. 3 and 9 to 14, the optical sheets OS1, OS2, and OS3 are disposed over the first main surface 51 of the light guide plate LG in this order. As in FIGS. 8 and 13, the convex PP1, PP2, and PP3 of the optical sheets OS1 to OS3 are layered in the concave 35 of the spacer plate 34 in this order, and furthermore, the positioning pin 33 is inserted in the hole TH. The convex PP2 is adhered to the convex PP1 through the double sided tape TPS, and the convex PP3 is adhered to the convex PP2 through the double sided tape TP6. The double sided tape TP7 is adhered to the convex PP3 and the upper surface 34a of the spacer plate 34, and the convex PP3 is fixed to the spacer plate 34. With such a structure, the planar direction of the optical sheets OS1, OS2, and OS3 is positioned with the convex PP1, PP2, and PP3. Therefore, as in FIGS. 9 to 14, at least three edges of the optical sheets OS1, OS2, and OS3, except for the edge in the light source side are opposed to the side plates 17c, 17d, and 17e of the case 16 with a slight gap (for example, 0.1 to 0.5 mm) therebetween. Then, the uppermost optical sheet OS3 is opposed to the entirety of the rear surface of the liquid crystal panel 12 with a predetermined gap therebetween.

As in FIGS. 2 and 9, while the optical sheets OS1 and OS2 are disposed on the light guide plate LG, the first holding part 24a of the first holding member 24 is interposed between the optical sheet OS3 and the liquid crystal panel 12, and is opposed to the opposite light source side end of the optical sheet OS3 with a slight gap therebetween. The first holding part 24a is positioned to overlap the frame area ED of the liquid crystal panel 12, and is opposed to the liquid crystal panel 12 with a slight gap (for example, 0.5 to 2.0 mm) therebetween. The first holding part 24a is opposed to the end of the opposite light source side of the optical sheets OS1 and OS2 to restrict shifting in positioning of the optical sheets in the thickness direction. Furthermore, if the liquid crystal panel 12 is slightly warped because of a load to the cover panel 14 and the liquid crystal panel 12, the liquid crystal panel 12 contacts the first holding part 24a and is supported by the first holding part 24a.

Figure 6:
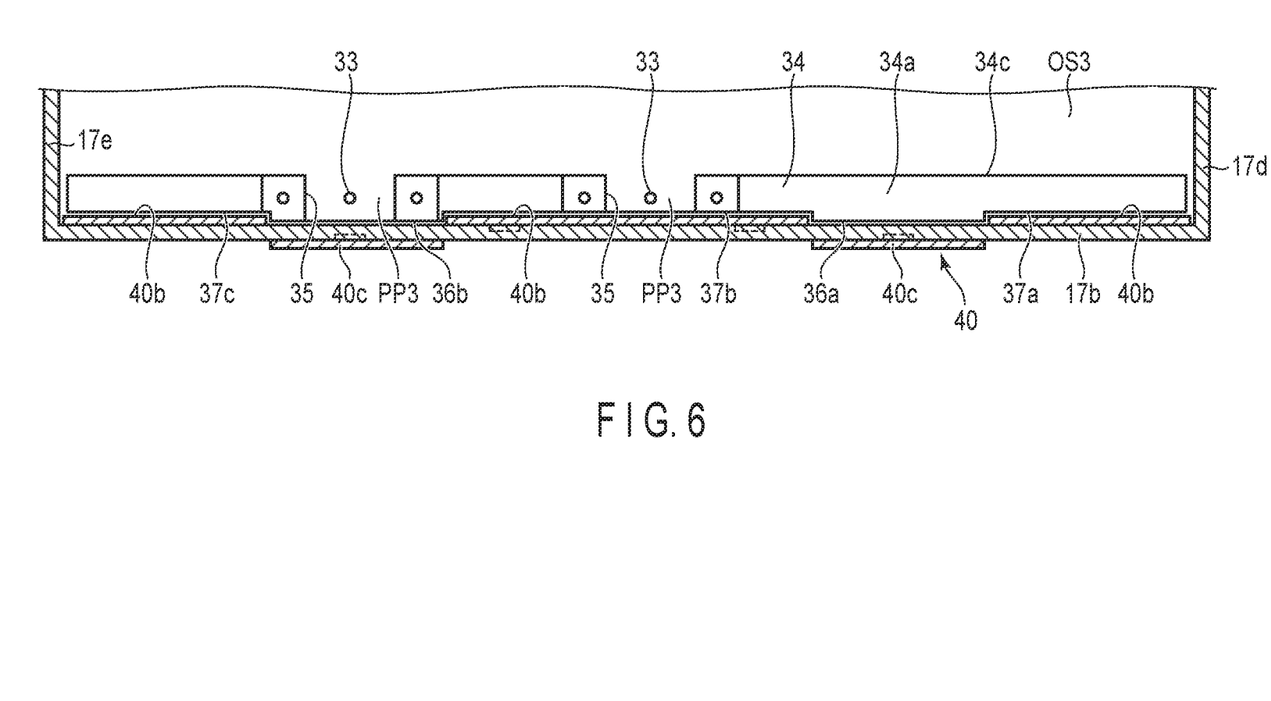
FIG. 6 is a plan view of the case to which the second holding member is attached with the light source side end of the case is partly cut off.

FIG. 6 is a plan view of the light source side end of the backlight unit including the cross-section of the side plate of the case and the second holding member attached to the side plate.

As in FIGS. 3, 6, and 12 to 14, the second holding member 40 is fixed to the case 16 by attaching the first fixation part 40b and the second fixation part 40c to the side plate 17b of the case 16. Three first fixation parts 40b are each disposed between the inner surface of the side plate 17b and the spacer plate 34, and when the first stopper claw 42a of the first fixation part 40b engages with the first stopper claw 21a of the side plate 17b, are each attached to the side plate 17b. Two second fixation parts 40c are arranged in the outer surface side of the side plate 17b in a position where two concaves 18 are disposed, and when the second stopper claw 42b of the second fixation part 40c engages with the second stopper claw 21b of the side plate 17b, are attached to the side plate 17b. Furthermore, a pair of third fixation parts 40d each contact the corresponding inner surface of the side plates 17d and 17e, and when the third stopper claw 42c of the third fixation part 40d engages with the third stopper claw 21c of the side plates 17d and 17e, are attached to the side plates 17d and 17e. As above, the second holding member 40 is fixed to the side plate 17 while the side plate 17b is held from both surface sides by the first fixation parts 40a and the second fixation parts 40c.

As in FIGS. 12 to 14, the second holding part 40a of the second holding member 40 extends approximately vertically from the side plate 17b inward the case 16, and is interposed between the light source side end of the optical sheet OS3 and the liquid crystal panel 12. The second holding part 40a extends over the entirety of the side plate 17b, and covers the light source unit 30, spacer plate 34, light source side end of the light guide plate LG, and light source side end of the optical sheets OS1 to OS3. The second holding part 40a is positioned to overlap the frame area ED of the light guide plate LG, and is opposed to the liquid crystal panel 12 with a slight gap (for example, 0.5 to 2.0 mm) therebetween. The second holding part 40a is opposed to the light source side end of the optical sheet OS3 with a slight gap therebetween. In the present embodiment, a cushion sheet CH or an adhesive agent layer functioning as an elastic member is disposed between the extending end of the second holding part 40a and the rear surface of the liquid crystal panel 12. The extending end of the second holding part 40a contacts the rear surface of the liquid crystal panel 12 through the cushion sheet CH to support the liquid crystal panel 12.

With the second holding member 40 structured as above, the positional shifting of the optical sheets is restricted while thermal expansion of the optical sheets OS1 and OS2 is accepted. With the first fixation part 40b and the second fixation part 40c holding the side plate 17b from both sides, mechanical strength of the side plate 17b and the case 16 can be increased. Furthermore, the second holding part 40a extends over the side plates 17d and 17e which are opposed to each other, and is connected to the both side plates 17d and 17e and the side plate 17b, and thus, the second holding part 40a functions as a beam member which increases mechanical strength of the light source side end of the case 16. Furthermore, since the second holding part 40a is arranged to cover the light source unit 30, and functions as a light shielding member to shield the light leaked from the light source unit 30.

With the backlight unit 20 structured as above is accommodated in the case 16 fixed to the cover panel 14, and is supported by the cover panel 14 through the case 16. The backlight unit 20 is opposed to the liquid crystal panel 12 with a gap therebetween, which means it does not directly contact the liquid crystal panel 12.

In the liquid crystal display device of the present embodiment structured as above, the cover panel 14 is fixed to the liquid crystal panel 12, and the case 16 accommodating the backlight unit 20 is directly fixed to the cover panel 14, and thus, a front frame, resin frame, and the like which have been conventionally used can be omitted, and a thinner liquid crystal display device with a narrower frame area can be achieved. Furthermore, the first holding member 24 is provided with the opposite light source side of the case 16, and with the first holding member 24, positional shifting, detachment of optical members such as optical sheet OS, light guide plate LG, and the like in the thickness direction are prevented.

The second holding member formed of a metal plate is provided with the light source side of the case 16, and the second holding member 40 covers the light source unit and the light source side ends of the light guide plate and the optical sheets, and thus, positional shifting and detachment of the optical sheet OS and the light guide plate LG in the thickness direction are prevented. With the cover by the second holding member 40, look of the optical sheet end and light guide plate end may be improved, and the look distribution of the LEDs side may be improved. At the same time, with the second holding member 40, light leakage from the light source unit 30 can be shielded, and the look of the light source side end and the display quality can be increased. Furthermore, by fixing the second holding member 40 to the side plate 17b and a pair of the side plates 17d and 17e of the case 16, the second holding member 40 functions as a beam, and the rigidity and mechanical strength of the light source side end of the case 16 can be increased.

As described above, the case 16 accommodating the backlight unit 20, that is, the case 16 supporting the backlight unit 20 is fixed to the cover panel 14, and the backlight unit 20 is supported by the cover panel 14 through the case 16, and thus, the backlight unit 20 and the liquid crystal panel 12 can be arranged in the case 16 while a gap is maintained between the backlight unit 20 and the rear surface of the liquid crystal panel 12. With such a gap, possible deformation, oscillation, and the like of the backlight unit 20 do not affect the liquid crystal panel, and abnormality of the display of the liquid crystal panel can be avoided.

As can be understood from the above, according to the present embodiment, a thinner liquid crystal display device with a narrower frame area can be achieved while maintaining the rigidity and strength.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

All structures which can be achieved by a person having ordinary skill in the art with arbitral design changes based on the above-described embodiment are encompassed by the scope of the present invention without departing from the concept of the present invention. For example, the outer shape and the inner shape of the structural member of the liquid crystal panel, the backlight unit, and the case are not limited to the rectangular shape, and one or both of the outer shape and the inner shape may be shaped as a polygon, circle, ellipse, or combination thereof. The liquid crystal display device and the backlight device may not be limited to a flat shape, and a part or the entirety thereof may be curved or inclined. The materials of the structural members are not limited to the above-described examples, and various changes may be adopted.

Other possible advantages obvious from the description of the present application or easily conceivable by a skilled person would be considered naturally achievable by the present invention.

What is claimed is:

1. A display device comprising:
a case comprising a bottom plate and a plurality of side plates standing along side edges of the bottom plate;
a liquid crystal panel in the case, the liquid crystal panel having a rear surface opposed to the bottom plate with a gap therebetween;
a backlight device between the liquid crystal panel and the bottom plate in the case, the backlight device comprising
a light guide plate on the bottom plate,
an optical sheet on the light guide plate and opposed to the rear surface of the liquid crystal panel with a gap therebetween, and
a light source device between an incident surface of the light guide plate and one of the side plates, the light source device comprising a wiring board disposed on the bottom plate and a plurality of light emitting elements mounted on the wiring board, wherein an end portion of the light guide plate is disposed on the wiring board and the incident surface is opposed to the light emitting elements, the side plates include a first side plate opposed to the incident surface and a second side plate opposed to the first side plate;
a first holding member provided on the second side plate in the case to be interposed between a peripheral edge part of the optical sheet and the rear surface of the liquid crystal panel, the first holding member facing the peripheral edge part of the optical sheet; and
a second holding member attached to the first side plate, and including a second holding part interposed between the optical sheet and the rear surface of the liquid crystal panel and opposed to the wiring board in a direction perpendicular to the bottom plate to cover the light source device and an end part of the optical sheet on the light source device side.

2. The display device of claim 1, wherein the first holding member is formed of a metal plate, and the first holding member includes a fixation part fixed to an inner surface of the second side plate, and a first holding part extending from the fixation part through between the optical sheet and the liquid crystal panel.

3. The display device of claim 1, wherein the second holding member is formed of a metal plate, and the second holding member includes a first fixation part fixed to the inner surface of the first side plate, a second fixation part fixed to an outer surface of the first side plate, and
the second holding part extending from the first and second fixation parts through between the optical sheet and the liquid crystal panel.

4. The display device of claim 2, wherein the second holding member is formed of a metal plate, and the second holding member includes a first fixation part fixed to the inner surface of the first side plate, a second fixation part fixed to an outer surface of the first side plate, and the second holding part extending from the first and second fixation parts through between the optical sheet and the liquid crystal panel.

5. The display device of claim 1, further comprising a spacer plate between the first side plate and the incident surface of the light guide plate to be overlaid on the light source device, the spacer plate having an upper surface with a positioning part, and a side surface opposed to the first side plate, wherein
the optical sheet has a convex configured to be engaged with the positioning part.

6. The display device of claim 5, wherein the positioning part has a concave formed in the upper surface of the spacer plate and a pin projecting on a bottom surface of the concave, and
the convex of the optical sheet is placed in the concave while the pin is inserted through a hole formed in the convex of the optical sheet.

7. The display device of claim 6, wherein the first side plate includes a concave at a position opposed to the concave of the positioning part,
the liquid crystal panel comprises a display area, a frame area around the display area, and a wiring board attached to the frame area, and
the wiring board extends to an outside of the case through the concave of the first side plate.

8. The display device of claim 1, wherein the liquid crystal panel includes a display area and a frame area around the display area, and
the first holding member and the second holding member are arranged to overlap the frame area.

9. The display device of claim 2, wherein the first holding part of the first holding member is opposed to the frame area of the liquid crystal panel with a gap therebetween, the first holding part configured to support the liquid crystal panel when the liquid crystal panel bends, and
the second holding part of the second holding member is opposed to the frame area of the liquid crystal panel with a gap therebetween, and an elastic member is provided between the second holding part and the liquid crystal panel.

10. The display device of claim 1, further comprising a cover panel arranged to overlap the display surface of the liquid crystal panel, wherein
the cover panel is fixed to edges of the side plates of the case.

11. The display device of claim 10, wherein the liquid crystal panel is attached to the cover panel via an adhesive layer.

12. The display device of claim 11, wherein the first holding member includes a fixation part fixed to an inner surface of the second side plate, and a first holding part extending from the fixation part through between the optical sheet and the liquid crystal panel, the first holding part of the first holding member is opposed to a frame area of the liquid crystal panel with a gap therebetween, and configured to support the liquid crystal panel when the liquid crystal panel bends, and the second holding part of the second holding member is opposed to the frame area of the liquid crystal panel with a gap therebetween, and an elastic member is provided between the second holding part and the liquid crystal panel.

13. The display device of claim 2, wherein a height of the fixation part of the second holding member from the bottom plate is larger than a thickness of the backlight device.

14. The display device of claim 5, wherein the spacer plate is disposed between the light source device and the fixation part of the second holding member.

15. The display device of claim 5, wherein the spacer plate is disposed between the light emitting elements and the fixation part of the second holding member.

16. The display device of claim 5, wherein the spacer plate is disposed between the light emitting elements and the first side plate.

17. The display device of claim 5, wherein the spacer plate is formed of a resin.

* * * * *